3,271,147
COACERVATE MORDANT DISPERSIONS
FOR ACID DYES
Walter M. Bush, Rochester, N.Y., assignor to Eastman Kodak Company, Rochester, N.Y., a corporation of New Jersey
No Drawing. Filed July 19, 1962, Ser. No. 211,094
20 Claims. (Cl. 96—29)

This invention relates to dye mordanting compositions and more particularly, to dye mordanting layers useful either integral with or contiguous to photographic color elements.

Mordanting, and thus immobilizing, soluble dyes in hydrophilic polymeric colloids such as gelatin, which are commonly employed as the film-forming colloids in photographic materials, is commonly accomplished by causing the dyes to enter into a salt-forming reaction with (1) ionic groups in the principal film-forming colloid, (2) ionic groups in a compatible polymer admixed in minor proportion with the colloid, or (3) ionic groups in nonpolymeric compounds admixed with the colloid.

However, a sufficient concentration of ionic mordanting groups in the film-forming polymer or in a polymer added for mordanting purposes may adversely modify the properties of the colloid. In addition, since it is virtually impossible to prepare polymers of uniform molecular weight, dye-mordanting polymers usually contain some low molecular weight material which can cause trouble by diffusing laterally within the layer or by migrating into an adjacent layer. This is particularly serious when the dye is being deposited as a pattern or image.

Nonpolymeric mordant compounds offer some obvious advantages. Compounds of this type, having a uniform composition, are easier to prepare and purify than polymeric mordants, and changes in structure and in concentration can be made without modifying the chemistry of the polymeric ingredients of the layer.

However, nonpolymeric mordants also present difficulties. Not only are the physical, chemical, and photographic properties of the colloid frequently affected adversely by the salt-forming groups, but hydrophobic ballast groups of such mordant compounds to reduce its diffusibility in the hydrophilic colloid vehicle decrease compatibility with the colloid so that it is difficult to prepare a stable, homogeneous dispersion. Furthermore, the combination of a hydrophobic ballast group and a salt-forming group often imparts surfactant and emulsifying properties to the mordant so that excess mordant may emulsify the contiguous mordanted dye and cause it to deteriorate and to wander.

It is an object of this invention to provide novel dye-mordanting compositions in which are utilized the advantages, but which overcome the shortcomings, of non-polymeric ionic mordants.

It is another object of our invention to provide a new hydrophilic film-forming colloid containing at least one cationic, orgainc, nonpolymeric, stabilized and immobilized mordant for acid dyes.

It is another object of the invention to provide new photographic dye mordanting compositions.

It is another object of the invention to provide a new photographic element having at least one dye-mordanting layer comprising a hydrophilic polymer containing a non-polymeric cationic mordant.

It is another object of the invention to provide a novel receiving element for acid dyes.

It is another object of the invention to prepare by a novel process mordanted dye images of improved color characteristics and stability to light and heat.

It is still another object of this invention to provide a novel photographic color diffusion transfer process.

These and other objects of the invention are accomplished with mordanting compositions comprising at least one hydrophilic organic colloid containing a finely-divided, uniform dispersion of particles of a salt of an organic acidic composition containing free acid moieties and a cationic, nonpolymeric, organic dye-mordanting compound for acid dyes.

Such mordanting compositions have particular utility in the photographic art and can be directly coated on a photographic support to serve as a dye receiving sheet, or as an overlayer or interlayer on photographic elements, or added to photographic emulsion layers. The mordanting compositions of the invention are especially useful for preparing elements for receiving and mordanting diffusible acid dye images in photographic color diffusion transfer processes.

Incorporating the nonpolymeric organic cationic mordants in layers according to the invention results in (1) reducing diffusibility of the mordanting compound and of the mordanted dye, (2) increasing the stability to light and heat of the mordanted dye, (3) insulating the mordant to render it physically, chemically, and photographically inert, and (4) improvement in the density of the mordanted dye images.

The mordants utilized in practicing the invention can be widely varied. The choice of mordant is generally dictated by practical considerations familiar to those skilled in the art, e.g., expediency in preparation of the compound, solubility in organic solvents, types of dyes, absorption of the dye-mordant salt, types of hydrophilic colloid used to disperse the salt particles, light fastness of the dyes, and the like factors.

The nonpolymeric organic mordant compounds useful in our invention have cationic groups which are capable of entering into salt-forming reactions, e.g., a quaternary ammonium group and at least one hydrophobic group, which inhibits wandering, e.g., a long chain aliphatic group. Such cationic mordant compounds are well-known to those skilled in the art and can be either water soluble or water insoluble.

Basic or cationic mordant compounds useful in the dye-mordanting compositions of our invention for immobilizing soluble acid dyes, include quaternary ammonium and phosphonium, and ternary sulfonium compounds in which there is linked to the N, P, or S 'onium atom at least one hydrophobic ballast group, such as long chain alkyl or substituted alkyl groups. The 'onium atom can be part of an open chain or of a heterocyclic ring and there can be more than one 'onium atom in the molecule.

Typical cationic mordants which are useful in our invention include the following compounds which are referred to hereinafter by number as indicated.

TABLE I.—CATIONIC MORDANT COMPOUNDS
No.:
    (1) Octadecyltri-n-butylammonium bromide.
    (2) Tetradecyltri-n-butylammonium bromide.
    (3) Octadecyltri-n-octylammonium bromide.
    (4) Octadecyltri-n-decylammonium bromide.
    (5) Methyltri-n-laurylammonium p-toluenesulfonate.

(6) Methyltri-n-decylammonium p-toluenesulfonate.
(7) Tetra-n-octylammonium bromide.
(8) Tetra-n-decylammonium bromide.
(9) Tetra-n-laurylammonium bromide.
(10) N,N-dimethyl-N-($\beta$-hydroxyethyl)-N-($\gamma$-stearamidopropyl) ammonium dihydrogen phosphate.
(11) N,N-dimethyl-N-($\beta$-hydroxyethyl)-N-($\gamma$-stearoyloxypropyl) ammonium chloride.
(12) N,N-dimethyl-N-($\beta$-hydroxyethyl)-N-(p-tert-octylphenoxydiethoxyethyl)-ammonium methosulfonate.
(13) N,N-dimethyl-N-($\beta$-hydroxyethyl)-N-(p-tert-octylphenoxytetraethoxyethyl)-ammonium methosulfonate.
(14) N,N-dimethyl-N-($\beta$-hydroxyethyl)-N-(N-methyl-$\gamma$-stearamidopropyl) ammonium bromide.
(15) Cetyltrimethylammonium bromide.
(16) 17,17,20,20,31,31,34,34-octamethyl-17,20,31,34-tetrazapentacontaniumtetrabromide.
(17) 1,4-dihexadecyl-1,4-diazabicyclo[2.2.2]octanium dichloride.
(18) 1,4-didodecyl-1,4-diazabicyclo[2.2.2]octanium p-toluene sulfonate.
(19) 1,4-bis[$\gamma$-(2,4-di-tert-amylphenoxy)butyl]-1,4-diazabicyclo[2.2.2]octanium chloride.
(20) 1,4-di-n-hexadecyl-1,4-diazabicyclo[2.2.2]octanium dithiocyanate.
(21) 1,4-di-n-decyl-1,4-diazabicyclo[2.2.2]octanium perchlorate.
(22) 1,10-decamethylenebis(4-lauryl-1,4-diazabicyclo[2.2.2]octanium) tetrabromide.
(23) n-Octadecyltri-n-butylphosphonium bromide.
(24) n-Hexadecyltriphenylphosphonium bromide.
(25) 5,5,7,7-tetramethyl-2-octenyltri-n-butylphosphonium chloride.
(26) 1-(3,5-dioxo-6-oxa-4-aza)tetracosyltri-n-butylphosphonium bromide.
(27) 1,1-dimethyl-1-(n-hexadecyl)hydrazonium perchlorate.
(28) 1,1-dimethyl-1-($\gamma$-stearamidopropyl)hydrazonium chloride.
(29) N-cetyl-N-ethylmorpholinium p-ethosulfate.
(30) N-methyl-N-myristyloxymethylmorpholinium p-toluenesulfonate.
(31) 1,4-dimethyl-1,4-di-n-laurylpiperazinium dibromide.
(32) S-n-butyl-S-methyl-S-n-octadecylsulfonium p-toluenesulfonate.
(33) S-ethyl-S-methyl-S-($\gamma$-stearoyloxypropyl)sulfonium p-toluenesulfonate.
(34) S,S-di-n-lauryl-S-methylsulfonium thiocyanate.
(35) N,N-dimethyl-N-($\beta$-dimethylaminoethyl)-N-(n-hexadecyl) ammonium bromide.
(36) Hexadecyltri-n-butylphosphonium bromide.
(37) N-dodecyl-N-methylmorpholinium chloride.
(38) N-methyl-N-octadecyloxymethylmorpholinium p-toluenesulfonate.
(39) Methyltri-n-laurylammonium chloride.
(40) n-Octadecyl-dimethyl-$\beta$-hydroxyethyl ammonium bromide.
(41) Sec.-butyl-1,4-diazabicyclo[2.2.2]octanium dibromide.
(42) N-cyclohexyl-N,N-dimethyl-N-(dodecylthiomethyl) ammonium-p-toluene sulfonate.
(43) Octadecyltrimethylammonium bromide.
(44) Cetyltrimethylammonium bromide.
(45) N,N-dimethyl-N-($\beta$-hydroxyethyl)-N-($\gamma$-stearamidopropyl) ammonium chloride.
(46) N,N-dimethyl-N-($\beta$-hydroxyethyl)-N-($\gamma$-stearamidopropyl) ammonium thiocyanate.

A wide variety of cationic mordant compounds are useful in the invention including organic quaternary phosphonium salts, organic ternary sulfonium salts and such organic quaternary ammonium salts as morpholinium salts, piperazinium salts, tetraammonium salts, 1,4-diazabicyclo[2.2.2]octanium salts and the like. Illustrative of such cationic mordant compounds are

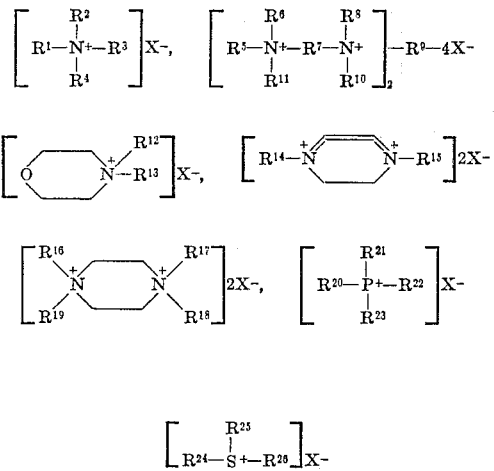

and

In the above formulas: $R^1$, $R^2$, $R^5$, $R^6$, $R^8$, $R^{10}$, $R^{11}$, $R^{14}$, $R^{15}$, $R^{16}$, $R^{17}$, $R^{18}$, $R^{19}$, $R^{20}$, $R^{21}$, $R^{22}$, $R^{24}$ and $R^{25}$ are alkyl radicals; $R^{15}$ is an alkyl radical or a hydrogen atom; $R^3$, $R^4$, $R^{12}$, $R^{13}$, $R^{23}$ and $R^{26}$ are alkyl radicals, substituted alkyl radicals such as alkylamidoalkyl, acyloxyalkyl, alkylphenoxyalkoxyalkyl, alkoxyalkyl, alkylthioalkyl dialkylaminoalkyl, hydroxyalkyl, and the like, or a cyclohexyl radical; $R^3$ or $R^4$ can also be amino radicals; $R^7$ and $R^9$ are alkylene radicals; X is an acid anion such as Br−, Cl−, I−, CNS−, p-toluenesulfonate and the like. At least one of the substituents on each mordant compound contains a radical having at least 8 carbon atoms for ballasting purposes. Alkyl and alkylene radicals in the above formulas generally have from 1 to 22 carbon atoms. The subject mordant compounds can be utilized either alone or in combinations of more than one mordant.

The term "nonpolymeric" used herein with reference to the present mordant compounds means that the cation of the basic mordant does not have regularly recurring units containing the cationic group beyond the dimer structure. However, the ballast group attached to the quaternary or ternary atom of the cation group can contain repeating groups, such as tetraethoxy, polymethylene, etc.

The mordant compounds useful in the invention can be readily prepared.

The N,N - dialkyl - N - ($\beta$ - hydroxyalkyl)-N-($\gamma$-alkylamidoalkyl) ammonium compounds can be made by reacting a fatty acid with a dialkylaminoalkylamine to form the corresponding amide, which is quarternized with an ethylene halohydrin to form the corresponding quaternized salt.

Tetralkylammonium and phosphonium salts can be made by reacting an alkyl halide with a trialkylamine or phosphine.

Alkyl tetraquaternaryammonium salts, e.g., Compound 16, Table I, can be made by reacting 1 mole of tetralkyl alkylene-diamine with 1 mole of alkyl halide and then quaternizing by adding one-half mole of alkyl halide to the resulting product.

The diazabicyclo[2.2.2]octanium compounds can be prepared by the procedure described by Oae et al., J. Org. Chem., 24, 1348 (1959).

Quaternary hydrazonium compounds can be prepared by reacting a trialkylamine with chloramine to form the hydrazonium chloride.

Ternary sulfonium salts can be prepared according to the methods described on page 200 of "Surface Active Agents," A. M. Schwartz, J. W. Perry, volume I (1949).

The N,N-dialkylmorpholinium chlorides can be prepared by the methods described in Erickson U.S. Patents 2,694,707 and 2,694,708, issued November 16, 1954, by reacting secondary amines with bis (2-chloroethyl) ether.

The above described nonpolymeric, cationic organic mordants are reacted substantially completely with an organic acidic composition to form a salt or coacervate that is then dispersed in a hydrophilic polymer.

A wide variety of organic acidic compositions (i.e. having free acid groups such as carboxy and sulfonic acid groups) can be utilized to prepare the present salts including gelatin that has been acylated with a dicarboxylic acid such as phthalic, malonic, succinic, maleic, glutaric, suberic, azelaic, subacic and the like acids; polymers containing such moieties as

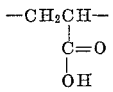

long chain fatty acids such as stearic acid, and other ballasted organic compounds containing a carboxylic acid moiety such as di-n-amylphenoxybutyric acid; long chain alkyl sulfates and sulfonates; and the like organic acidic compounds. I prefer to utilize acylated gelatin for preparing the mordant salts of the invention wherein the dicarboxylic acid has the formula

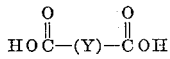

wherein Y is a divalent hydrocarbon radical, such as phenylene and alkylene, having 1 to 10 carbon atoms. The preparation of such acylated gelatin compositions is disclosed in Yutzy et al., U.S. Patent No. 2,525,753, issued October 10, 1950. The organic acid composition is sufficiently ballasted to render the resulting salt hydrophobic in the protective colloid in which it is dispersed.

A wide variety of protective colloids can be used as vehicles for the present salts. Suitable protective colloids are such hydrophilic polymers as gelatin and its water-soluble derivatives; polyvinyl alcohol and its water-soluble derivatives, including copolymers thereof; water-soluble vinyl polymers such as polyacrylamide, imidized polyacrylamide, etc.; colloidal albumin; water-soluble cellulose derivatives such as ethanolamine cellulose acetate; and related water-soluble film-forming hydrophilic polymers that form water-permeable coatings. Likewise, if the organic acidic composition is a hydrophilic organic colloid, an excess of this material over that utilized to form a salt with the mordant compound can be used as the protective colloid for the dispersed salt. Mixtures of two or more of such colloids can be utilized. Gelatin is preferred.

In preparing the mordanting compositions of the invention, the cationic mordant compound and the organic acidic composition are combined in solution to form a salt, water, water-miscible or low-boiling organic solvents being preferably utilized to dissolve the salt components. The resulting salt is then blended with a hydrophilic polymer serving as a vehicle as described above. The salt is substantially uniformly dispersed in the hydrophilic polymer as finely-divided particles that are generally less than about 30 microns in diameter and preferably less than about 10 microns in diameter.

Typical low-boiling or water-soluble organic solvents that can be utilized in preparing the subject salts include:

(1) Substantially water-insoluble low-boiling solvents such as ethyl and butyl acetates, ethyl propionate, butyl alcohol, ethyl formate, nitroethane, chloroform, etc., and (2) Water-soluble solvents, such as methyl isobutyl ketone, β-ethoxy ethyl acetate, β-butoxy-β-ethoxy ethyl acetate, tetrahydrofurfuryl adipate, diethylene glycol monoacetate, β-methoxymethyl acetate, acetonyl acetone, diacetone alcohol, diethylene glycol monomethyl ether, ethylene glycol, dipropylene glycol, acetone, ethanol, acetonitrile, dimethylformamide, dioxane, etc.

The low-boiling or water-soluble solvent can be removed from the dispersion, for example, by air drying a chilled, noodled dispersion, or by continuous water washing.

Likewise, high-boiling, water-immiscible, organic liquids having a boiling point above about 175° C. can be utilized in the present mordant dispersion system. Any of the high-boiling, water-immiscible solvents described on page 2, col. 2 and page 3, col. 1 of U.S. Patent 2,322,027, issued June 15, 1943, can be used. Particularly useful solvents are organic carboxylic acid esters and organic phosphate esters. Typical solvents include di-n-butyl-phthalate, benzyl phthalate, ethyl benzyl malonate, tetrahydrofurfuryl succinate, triphenyl phosphate, tri-o-cresyl phosphate, diphenyl mono-p-tert-butyl phenyl phosphate, monophenyl di-o-chlorophenyl phosphate, tri-p-tert-butylphenyl phosphate, 2,4-di-n-amylphenol, and the like.

The mordanting compositions of the invention can be coated on a wide variety of supports including such photographic supports as paper, and films of cellulose acetate, polystyrene, polyethylene terephthalate and the like.

The mordant layers of the invention are useful in color diffusion transfer processes such as dye transfer processes in which dyes are imbibed into gelatin relief matrices and subsequently transferred from these matrices by diffusion into mordanted receiving layers brought into contact, such a process being described in "Kodak Dye Transfer Process," Publication No. E–80 of Eastman Kodak Company, Rochester, New York.

The mordant layers of the invention are useful for immobilizing and stabilizing the dye images produced in multicolor diffusion transfer processes described in Belgian Patents 578,470, granted November 6, 1959; 585,686, granted June 15, 1960 and 603,747, granted May 31, 1961. In these processes there are produced subtractively colored images composed of diffusible acid dyes which are formed from nondiffusible couplers at the site of silver development. These acid dyes transfer by diffusion to a contiguous layer containing a cationic mordant.

The mordant compositions of the invention can also be used for immobilizing and stabilizing diffusible dye images in processes, such as described in British Patent 804,971, issued November 26, 1958, and Belgian Patent 607,420, granted August 15, 1961. These processes utilize "dye developers" that are weak acid dyes also containing in the molecule a developing function. They become immobilized by oxidation at sites of silver development, the residual unoxidized dye developer transferring to a receiving layer containing a cationic mordant.

The mordant compositions of the invention can also be used in hydrophilic colloid layers of a photographic element to mordant, for example, antihalation and filter dyes.

A wide variety of water-soluble acid dyes can be mordanted with the mordanting compositions of the invention. Water-soluble acid dyes are well known materials to those skilled in the art. Such dyes contain acid groups, for example, carboxylic, sulfonic, ionizable sulfonamido and hydroxy substituteed aromatic or heterocyolic groups which lend to the dyes negative charges. Such anionic dyes can be readily immobilized by means of the cationic mordant compounds in the mordanting compositions of the invention.

The following examples further illustrate preferred embodiments of the invention.

Example I

Dispersions containing the dye-mordanting compositions of the invention using the cationic compounds listed under Table I above were made as described in this example. Solution A was made by dissolving 1.0 g. of cationic mordant compound in 5 ml. of water, and 3 ml. of isopropyl alcohol. Solution B was made by adding 0.25 ml. of the gelatin hardener, bis-2,3-epoxypropoxydiethyl ether, to 35 ml. of 15% aqueous 7% phthaloylated gelatin solution (made by reacting 7 parts by weight phthalic anhydride with 100 parts by weight of bone gelatin). To stirred solution B, solution A was added in a thin stream at 85° F. The resultant mordant dispersion contained particles that were substantially 2 to 10 microns in diameter. Dispersions were also made by the procedure of this example, but using succinoylated gelatin (made by reacting 4.73 parts by weight of succinic anhydride with 100 parts by weight of bone gelatin) in lieu of the phthaloylated gelatin.

Example II

A 0.22 gram portion of Thiogel "B" (Schwarz Bio Research, Inc.), a thiolated gelatin in which a thiolactone has been coupled with the gelatin structure to form a composition having an average molecular weight of about 100,000 and an average SH equivalents in 100,000 grams of about 12, was triturated with 3.5 ml. of water at room temperature and dissolved by adding 4 ml. of hot water. This solution was then added to 25 ml. of 15% aqueous 7% phthaloylated gelatin solution (made by reacting 7 parts by weigh of phthalic anhydride with 100 parts by weight of bone gelatin). The resultant solution was heated to 90° F. and stirred continually while a solution of 1 g. of mordant #10 of Table I, N,N-dimethyl-N-($\beta$-hydroxyethyl) - N - ($\gamma$ - stearamidopropyl)ammonium dihydrogen phosphate, 11.5 ml. of water, and 4 ml. of 1% formaldehyde solution, held at 90° F., was added in a fast stream to the Thiogel B solution. A dispersion of polymeric salt particles substantially about 1 micron in diameter resulted.

Example III

Dispersions of discrete polymeric salt particles were made as follows by replacing some of the phthaloylated gelatin described in Example I with bone gelatin and hardening the gelatin with formaldehyde. A solution of 1 g. of Compound 46, Table I, was dissolved in 18 ml. of water and added at a solution temperature of 85° F. to a stirred solution containing 15 ml. of 10% bone gelatin solution and 15 ml. of 10% phthaloylated gelatin. Finally, 4 ml. of 1/ formaldehyde solution was added to the dispersion. Dispersions having the described phthaloylated gelatin to bone gelatin ratios of 75:25 and 25:75 were also made. Dispersions having the described phthaloylated gelatin and polyvinyl alcohol ratio of 75:25 were made by the above-mentioned procedure except that the 7 ml. of 10% polyvinyl alcohol (Du Pont Elvanol 71-30, medium viscosity, 98–100% hydrolyzed) replaced the 15 ml. of 10% bone gelatin and the amount of 10% phthaloylated gelatin was increased to 23 ml.

Example IV

A solution of 1 g. of mordant compound #10 of Table I in 3 ml. of isopropyl alcohol was added at a temperature of 80° F. to a stirred aqueous solution containing 10 ml. of 10% bone gelatin and 27 ml. of 7.5% acrylamide-acrylic acid copolymer (Cyanimen P-26, American Cyanamid Company). Three ml. of 1% formaldehyde solution was then added and the resulting dispersion coated on a cellulose acetate photographic film support.

Example V

Coating of the mordant compositions containing the compounds of Table I above, and prepared according to Examples I–III above, were prepared as described in this example. The dispersions made in Examples I–III were coated respectively on subbed cellulose acetate film support at a wet thickness of 0.009 inch and dried. The coatings of the mordant compositions of Example I contained about 210 mg. per square foot of mordant and 1100 mg. per square foot of gelatin; those of Example II contained about 190 mg. per square foot of mordant and 800 mg. per square foot of total gelatin; and those of Example III contained 175 mg. per square foot of mordant and 550 mg. per square foot of gelatin.

Example VI

The cationic mordant coatings prepared as described in Example II above were used as receiving sheets in the image transfer color process described in Whitmore et al., British Patent 840,731 published July 6, 1940, and German Patent 1,095,115 published December 16, 1960. The soluble acid dyes obtained from the following couplers were mordanted in these receiving sheets according to the procedure described in this example. The following couplers were used:

I. 2-(3,5-disulfobenzamido)-4-(3-octadecylcarbamyl-phenylthio)-5-methyl phenol dipotassium salt. (Cyan dye-forming coupler)
II. 1-phenyl-3-(3,5-disulfobenzamido)-4-(2-hydroxy-4-pentadecylphenylazo)-5-pyrazolone dipotassium salt. (Magenta dye-forming coupler)
III. $\alpha$-Benzoyl-$\alpha$-(3-octadecylcarbamylphenylthio)-3,5-dicarboxyacetanilide. (Yellow dye-forming coupler)
IV. 1-hydroxy-4-(3-octadecylcarbamylphenylthio)-N-ethyl-3',5'-dicarboxy-2-naphthanilide. (Cyan dye-forming coupler)
V. 1-(4-sulfophenyl)-3-(4-sulfoanilino)-4-(2-hydroxy-4-pentadecylphenylazo)-5-pyrazolone dipotassium salt. Magenta dye-forming coupler)
VI $\alpha$-Pivalyl-$\alpha$-(3-octadecylcarbamylphenylthio)-4-sulfoacetanilide, potassium salt. (Yellow dye-forming coupler)

Each of these couplers, i.e., I to VI above, was incorporated into separate single-layer gelatin silver bromoiodide emulsion coatings containing 90 mg. of coupler per square foot, 100 mg. of silver per square foot, and 300 mg. of gelatin per square foot. Samples of these coatings were exposed to a negative and developed for 5 minutes at 75° C. in contact with the receiving sheets using a color developer solution having the following composition:

| | |
|---|---|
| Benzyl alcohol, cc. | 10.0 |
| Ascorbic acid, g. | 0.2 |
| Potassium bromide, g. | 0.7 |
| Sodium carbonate·H$_2$O, g. | 20.0 |
| Sodium hydroxide, g. | 2.0 |
| 4-amino-N-ethyl-N-($\beta$-hydroxyethyl)aniline, g. | 10.0 |
| Water to make one liter. | |

The soluble acid dye images formed during development by the reaction of the couplers with the oxidized developing agent were transferred to and mordanted in the receiving sheets. Samples of the resulting mordanted dye images were subjected to 30 hours xenon arc exposure. Other samples were heated for 7 days at 140° F. and 65% relative humidity. The mordanted dye images were found to have good density and good stability to heat and light. Table II summarizes data pointing up the improved stability to light and heat possessed by dye images mordanted to the cation salt mordants according to my invention (Method A) as compared to similar dye images mordanted to the same cationic mordant compounds dispersed directly in a gelatin coating (Method B). These latter dispersions (Method B) were prepared according to the methods of Examples I–III except that the acid polymer was completely replaced with bone gelatin. The particle sizes of the dispersions made by this latter method were less than 1 micron in diameter.

TABLE II

| Compound No. (Table I) | Coupler Used | Wavelength of Maximum Absorption (λ max.) in mμ | Percent Improvement in Light Stability of Mordanted Dye Images at λ max. by Using Method A Compared to Method B After 30 Hours' Xenon Arc Exposure | Percent Improvement in Heat Stability of Mordanted Dye Images at λ max. by Using Method A Compared to Method B After 1 Week at 140° F. and 65% R.H. |
|---|---|---|---|---|
| 14 | II | 540 | 24 | 39 |
|  | III | 435 | 3 | 66 |
|  | IV | 640 | 36 | 62 |
|  | V | 530 | 20 | 100 |
|  | VI | 432 | 13 | 80 |
| 10 | II | 540 | 42 | 57 |
|  | III | 435 | 12.5 | 80 |
|  | IV | 640 | 17 | 100 |
| 1 | VI | 432 | 10 | 109 |
| 23 | VI | 432 | 27 | 100 |
| 11 | VI | 432 | 31 | 67 |
|  | V | 530 | 19 | 110 |
|  | V | 432 | 10 | 72 |
| 43 | IV | 640 | 19 | 76.5 |
| 44 | IV | 640 | 10 | 25 |
| 33 | IV | 640 | 25 | 50 |
|  | VI | 432 | 40 | 66 |

In additional tests dye images immobilized with mordant compositions containing mixtures of acid gelatin or other acid polymer as described in Examples III and IV showed much better light and heat stability than those in which only bone gelatin was present as the hydrophilic polymer, i.e., no acid polymer was present.

*Example VII*

The following data show the improvement in stability of receiving sheets prepared with the mordanting compositions of my invention (Method A) compared to the same onium compound dispersed directly in a gelatin coating (Method B). A receiving sheet containing 200 mg. per square foot of Compound 14, Table I, 750 mg. per square foot of 7% phthaloylated gelatin, and 50 mg. per square foot of bone gelatin was prepared according to my invention (see Example III above). A receiving sheet made by direct incorporation of Compound 14 into bone gelatin contained 200 mg. per square foot of Compound 14 and 800 mg. per square foot of bone gelatin according to Method B. One set of samples of the above coatings were kept at room temperature (75° F.), designated as fresh sample, and a second set was incubated for 1 week at 140° F., 70% relative humidity, designated as incubated sample. The density of the mordanted dye images, obtained by the transfer process described in Example VI using photographic emulsion coatings containing Couplers IV to VI described in Example VI, is given in Table III.

TABLE III

| Coupler Used | Percent Loss in Maximum Dye Density in Density Units of the Incubated Samples of My Invention Compared to the Fresh Samples | Percent Loss in Maximum Dye Density in Density Units of the Incubated Samples of Method B Compared to the Fresh Samples |
|---|---|---|
| IV | 0 | 17 |
| V | +4 (increase) | 13 |
| VI | 0 | 38 |

*Example VIII*

Receiving sheets were made according to Examples I and IV using the following mixtures of cationic mordants:

(1) 0.50 g. Compound 1 and 0.50 g. Compound 10
(2) 0.66 g. Compound 1 and 0.34 g. Compound 16
(3) 0.34 g. Compound 29 and 0.66 g. Compound 32
(4) 0.50 g. Compound 1 and 0.50 g. Compound 28
(5) 0.66 g. Compound 1 and 0.34 g. Compound 45
(6) 0.34 g. Compound 2 and 0.66 g. Compound 29

Samples of the mixed mordant receiving sheets prepared above were used to mordant soluble acid dyes obtained from Couplers II, III, and IV as described in Example VI. Other samples of the mixed mordant receiving sheets were used to mordant soluble dye developers in the process described in Example I of Weyerts et al., U.S. patent application Serial No. 50,932, filed August 22, 1960, corresponding to Belgian Patent 607,420, granted August 15, 1961. The resulting dye images gave good color and density and showed good stability to light and heat.

*Example IX*

Another procedure for making mixed mordant receiving sheets is described in this example. Solution A was made by dissolving 0.87 g. of N-cetyl-N-ethyl-morpholinium p-ethosulfate (Compound 29 of Table I) in 8.0 ml. of water. Solution B was made by dissolving 0.13 g. of methyl tri-n-laurylammonium p-toluenesulfonate in 4.5 ml. of ethanol. Solution C was made by mixing 25 ml. of 15% aqueous 7% phthaloylated gelatin solution, 3.75 ml. of a 15% pig gelatin solution, and 4 ml. of water. Solutions A and B were mixed together, and the resultant solution added to Solution C at 110° F., stirring for five minutes. A 0.25 ml. portion of bis-2,3-epoxypropoxydiethyl ether (hardener) was added to the stirred dispersion, and the dispersion was allowed to stand for 15 minutes before coating on a subbed cellulose acetate film support at a wet thickness of 0.009 inch and dried. Samples of the mixed mordant receiving sheet were then subjected to the same tests described above in Example VIII for the mixed mordant receivers. The resulting mordant dye images gave good color, density, and stability.

*Example X*

This example shows the use of my mordant gelatin dispersion compositions in filter dye layers. A photographic element was prepared using a cellulose acetate film support on which was coated a red-sensitized gelatin silver bromoiodide emulsion containing the cyan dye-forming coupler, 2-[α-(2,4-di-tert-amylphenoxy)butyramido]-4,6-dichloro-5-ethylphenol.. Over the red-sensitive emulsion was coated a green-sensitized gelatin silver bromoiodide emulsion containing a magenta dye-forming coupler, 1-(p-tert-butylphenoxyphenyl)-3-[α-(p-tert-butylphenoxy) propionamido] - 5 - pyrazolone. Over the green-sensitized layer was coated a gelatin layer containing tartrazine, a yellow filter dye, mordanted to Compound 10, Table I, incorporated by the dispersion method as described in Example V. Over the filter layer was coated a blue-sensitized gelatin silver bromoiodide emulsion layer containing a yellow dye-forming coupler, α-benzoyl - 5 - [(2,4-di-tert-amylphenoxy)acetamido] - 2 - methoxyacetanilide. All the above silver bromoiodide emulsion layers were gold and sulfur sensitized. The multilayer coating was processed to a color positive by the process described in column 11 of Beavers et al., U.S. Patent 2,944,898, issued July 12, 1960. During color development, the yellow filter dye was removed, leaving the photographically inactive mordant in the filter layer.

*Example XI*

This is an example of the use of an integral mordant receiving layer containing the mordant composition of my invention in an incorporated coupler color photographic element, to fix in said element the soluble dye images formed by color development. A multilayer color element was prepared with the following order of layers coated on a paper support:

(1) A gelatin mordant layer containing Compound 29 incorporated as described in Example II above.
(2) A stripping layer of cellulose ether phthalate.
(3) A fogged gelatin silver bromoiodide emulsion layer containing the magenta dye-forming coupler, 1-phenyl-3-

(3,5 - disulfobenzamido) - 4-(4-octadecyloxyphenylazo)-5-pyrazolone.

(4) A green-sensitized gelatin silver bromoiodide emulsion layer containing the development inhibitor compound, 1-hydroxy-4-(2-nitrophenylthio)-N-[δ-(2,4-di-tert-amylphenoxy)butyl]-2-naphthamide.

(5) A fogged gelatin silver bromoiodide emulsion layer containing the cyan dye-forming coupler, 2-(3,5-disulfobenzamido)-5-methyl-4-(4 - octadecyloxyphenylazo)phenol, dipostassium salt.

(6) A red-sensitized gelatin silver bromoiodide emulsion layer containing the development inhibitor compound of layer 4.

(7) A gelatin filter layer containing yellow colloidal silver.

(8) A fogged gelatin silver bromoiodide emulsion layer containing the yellow dye-forming coupler, 1-hydroxy - 4 - {4-[3-methyl-4-(1,5-disulfo-3-naphthylazo)-1-pyrazol-5-onyl]phenylazo}-N-[δ-(3-pentadecylphenoxy) - butyl]-2-naphthamide, dipotassium salt.

(9) A top gelatin silver bromoiodide emulsion layer containing the development inhibiting compound of layer 4.

The prepared photographic element was developed for 10 minutes at 70° F. in a developing solution having the following composition:

| | G. |
|---|---|
| Sodium sulfite (anhydrous) | 2 |
| Sodium carbonate (anhydrous) | 20 |
| Potassium bromide | 1 |
| 4-amino-N,N-diethyl-3-methylaniline HCl | 2 |
| Water to make one liter. | |

The soluble dye images, formed in the silver halide layers, diffused into the integral mordant layer which was then stripped from the emulsion layers to yield a print having mordanted dye images of good density and good stability to light and heat.

*Example XII*

This is an example of the use of incorporated coupler silver halide emulsion layers containing the mordant compositions of my invention in a multilayer element in order to increase the stability of dye images formed by color development in said element. A multilayer color element was prepared with the following order of layers coated on a subbed cellulose acetate film support:

(1) A red-sensitized gelatin silver bromoiodide emulsion layer containing the cyan dye-forming coupler 2-[α-(2,4-di-tert-amylphenoxy)acetamido]-4,6-dichloro - 5- methylphenol, tri-o-cresyl phosphate, and Compound 45, Table I, incorporated as a dispersion as described in Example I above.

(2) A gelatin interlayer.

(3) A green-sensitized gelatin silver bromoiodide emulsion layer containing the magenta soluble dye-forming coupler, 1-phenyl-3-(3,5-dicarboxybenzamido)-4-(3-octadecylcarbamylphenylthio)-5-pyrazolone.

(4) A gelatin filter layer containing yellow colloidal silver.

(5) A blue-sensitized gelatin silver bromoiodide emulsion layer containing the yellow dye-forming coupler, α-{3 - [α - (2,4 - tert-amylphenoxy)acetamido]benzoyl}-2-methoxyacetanilide, tri-o-cresylphosphate, and Compound 45, Table I, incorporated as a dispersion as described in Example I above. The above photographic element was exposed to an image and developed in a 4-amino-N,N-diethyl-3-methylaniline hydrochloride color developing solution as described in Example XI. The soluble dye image formed in the magenta layer diffused to the mordant containing layers to give mordanted magenta dye images of increased stability to light and heat when compared to nondiffusible magenta dyes derived from organic solvent soluble couplers, such as 1-(p-tert-butylphenoxyphenyl) - 3-[α-(p-tert-butylphenoxy)propionamido]-5-pyrazolone and others disclosed, for example, in Porter U.S. Patent 2,369,489, issued February 13, 1945. Organic solvent soluble cyan and yellow couplers can also be replaced with respective cyan and yellow image transfer couplers in a multilayer element of the type described above using appropriate mordant layers to fix the soluble dyes formed during development.

*Example XIII*

A water-immiscible solvent, di-n-butyl phthalate, was included in dispersions of my invention to aid in controlling uniform particle size formation as described in this example. A 1.0 g. portion of Compound 45, Table I, was dissolved in 1.0 ml. of the water-immiscible organic solvent, di-n-butyl phthalate, 3 ml. of isopropyl alcohol, 3 ml. of ethyl acetate, and 5 ml. of water by heating the mixture to the reflux temperature of the mixture. This solution was emulsified by mixing it with agitation in a solution of 30 cc. of 15% aqueous 7% phthaloylated gelatin solution containing 0.25 ml. of bis-2,3-epoxypropoxydiethyl ether hardener. The resulting oil-in-water emulsion was passed through a colloid mill five times to more finely disperse the suspended droplets of mordant solution, and was then chilled to gel the composition. The resulting gel was cut up and dried to remove the water and volatile solvents. Then 4.8 g. of the dry dispersion were redispersed by adding to 31.8 ml. of water and heating with stirring at 40° C. The dispersion was then coated on a subbed cellulose acetate film support at a wet thickness of 0.009 inch and dried. Dyes of Couplers II, III and IV of Example VI above, mordanted to a sample of the prepared receiving sheet, exhibited good stability to light and heat.

*Example XIV*

A mordant dispersion of the invention was prepared as described in Example I using Compound 10 as the onium compound and di-n-amylphenoxybutyric acid in lieu of the phthaloylated gelatin. The dispersion was then coated on a cellulose acetate film support as described in Example V. The prepared coating is then used as a receiving sheet for the photographic color diffusion transfer process described in Example VI. Mordanted dye images having high heat and light stability result.

Thus, mordanting compositions having particular utility in preparing color photographic products result when nonpolymeric cationic mordant compositions are combined with acidic hydrophilic colloids to form a salt that is dispersed in a hydrophilic colloid. Such mordanting compositions have been demonstrated to have utility for mordanting water-soluble acid dyes. Dyes mordanted in accordance with the invention have excellent heat and light stability.

The invention has been described in detail with particular reference to preferred embodiments thereof, but it will be understood that variations and modifications can be effected within the spirit and scope of the invention as described hereinabove and as defined in the appended claims.

I claim:

1. A mordanting reception layer for acid dyes comprising a hydrophilic organic polymer containing substantially uniformly dispersed therein finely-divided particles less than about 30 microns in diameter of a hydrophobic salt prepared with gelatin acylated with a dicarboxylic acid having the formula

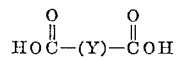

wherein Y is a divalent hydrocarbon radical having one to 10 carbon atoms and a nonpolymeric organic cationic mordant for acid dyes selected from the group consisting of compounds having the formulas

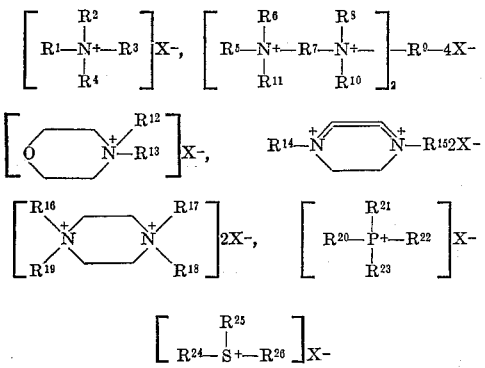

and

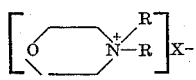

wherein:
A. $R^1$, $R^2$, $R^5$, $R^6$, $R^8$, $R^{10}$, $R^{11}$, $R^{14}$, $R^{15}$, $R^{16}$, $R^{17}$, $R^{18}$, $R^{19}$, $R^{20}$, $R^{21}$, $R^{22}$, $R^{24}$ and $R^{25}$ are alkyl radicals,
B. $R^3$ is selected from the group consisting of
   (1) an amino radical,
   (2) an alkyl radical, and
   (3) a cyclohexyl radical,
C. $R^4$, $R^{12}$, $R^{13}$, $R^{23}$ and $R^{26}$ are selected from the group consisting of
   (1) an alkyl radical, and
   (2) a cyclohexyl radical,
D. X is an acid anion, and
E. $R^7$ and $R^9$ are alkylene radicals;
said mordant being ballasted with at least one substituent having at least 8 carbon atoms.

2. A mordanting reception layer for acid dyes comprising a hydrophilic organic polymer containing substantially uniformly dispersed therein finely-divided particles less than about 30 microns in diameter of a hydrophobic salt prepared with gelatin acylated with a dicarboxylic acid having the formula $$HO\overset{O}{\overset{\|}{C}}-(Y)-\overset{O}{\overset{\|}{C}}OH$$

wherein Y is a divalent hydrocarbon radical having one to 0 carbon atoms and a nonpolymeric organic cationic mordant for acid dyes having the formula

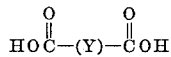

wherein R is an alkyl radical and X is an acid anion, at least one R having at least 8 carbon atoms.

3. A mordanting reception layer for acid dyes comprising a hydrophilic organic polymer containing substantially uniformly dispersed therein finely-divided particles less than about 30 microns in diameter of a hydrophobic salt prepared with gelatin acylated with a dicarboxylic acid having the formula $$HO\overset{O}{\overset{\|}{C}}-(Y)-\overset{O}{\overset{\|}{C}}OH$$

wherein Y is a divalent hydrocarbon radical having one to 10 carbon atoms and a nonpolymeric organic cationic mordant for acid dyes having the formula

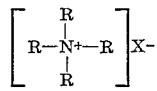

wherein R is an alkyl radical and X is an acid anion, at least one R having at least 8 carbon atoms.

4. A mordanting reception layer for acid dyes comprising a hydrophilic organic polymer containing substantially uniformly dispersed therein finely-divided particles less than about 30 microns in diameter of a hydrophobic salt prepared with gelatin acylated with a dicarboxylic acid having the formula $$HO\overset{O}{\overset{\|}{C}}-(Y)-\overset{O}{\overset{\|}{C}}OH$$

wherein Y is a divalent hydrocarbon radical having one to 10 carbon atoms and a nonpolymeric organic cationic mordant for acid dyes having the formula

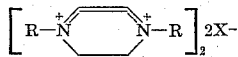

wherein R is an alkyl radical and X is an acid anion, at least one R having at least 8 carbon atoms.

5. A mordanting reception layer for acid dyes comprising a hydrophilic organic polymer containing substantially uniformly dispersed therein finely-divided particles less than about 30 microns in diameter of a hydrophobic salt prepared with gelatin acylated with a dicarboxylic acid having the formula $$HO\overset{O}{\overset{\|}{C}}-(Y)-\overset{O}{\overset{\|}{C}}OH$$

wherein Y is a divalent hydrocarbon radical having one to 10 carbon atoms and a nonpolymeric organic cationic mordant for acid dyes having the formula

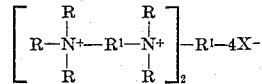

wherein R is an alkyl radical, $R^1$ is and alkylene radical and X is an acid anion, at least one of R and $R^1$ having at least 8 carbon atoms.

6. A mordanting reception layer as described in claim 1 wherein the hydrophilic organic polymer is selected from the group consisting of gelatin and polyvinyl alcohol.

7. A mordanting reception layer as described in claim 1 wherein the dicarboxylic acid used to acylate the gelatin is phthalic acid.

8. A mordanting reception layer as described in claim 1 wherein the dicarboxylic acid used to acylate the gelatin is succinic acid.

9. A mordanting reception layer for acid dyes comprising a gelatin substrate having substantially uniformly dispersed therein particles less than about 30 microns in diameter of a hydrophobic salt prepared with gelatin acylated with a dicarboxylic acid having the formula $$HO\overset{O}{\overset{\|}{C}}-(Y)-\overset{O}{\overset{\|}{C}}OH$$

wherein Y is a divalent hydrocarbon radical having 1 to 10 carbon atoms and a nonpolymeric organic cationic mordant for acid dyes selected from the group consisting of (1) Octadecyltri-n-butylammonium bromide,
(2) Tetradecyltri-n-butylammonium bromide,
(3) Octadecyltri-n-octylammonium bromide,
(4) Octadecyltri-n-decylammonium bromide,
(5) Methyltri-n-laurylammonium p-toluenesulfonate,
(6) Methyltri-n-decylammonium p-toluenesulfonate,
(7) Tetra-n-octylammonium bromide,
(8) Tetra-n-decylammonium bromide,
(9) Tetra-n-laurylammonium bromide,
(10) N,N-dimethyl-N-(β-hydroxyethyl)-N-(γ- stearamidopropyl) ammonium dihydrogen phosphate,
(11) N,N-dimethyl-N-(β-hydroxyethyl)-N-(γ-stearoyloxypropyl) ammonium chloride,
(12) N,N-dimethyl-N-(β-hydroxyethyl)-N-(p-tert-octylphenoxydiethoxyethyl)ammonium methosulfonate,
(13) N,N-dimethyl-N-(β-hydroxyethyl)-N-(p-tert-octylphenoxytetraethoxyethyl)ammonium methosulfonate,
(14) N,N-dimethyl-N-(β-hydroxyethyl)-N-(N-methyl-γ-stearamidopropyl)ammonium bromide,
(15) Cetyltrimethylammonium bromide,
(16) 17,17,20,20,31,31,34,34-octamethyl-17,20,31,34-tetrazapentacontaniumtetrabromide,
(17) 1,4-dihexadecyl-1,4-diazabicyclo[2.2.2]octanium dichloride,
(18) 1,4-didodecyl-1,4-diazabicyclo[2.2.2]octanium p-toluene sulfonate,
(19) 1,4-bis[γ-(2,4-di-tert-amylphenoxy)butyl]-1,4-diazabicyclo[2.2.2]octanium chloride,
(20) 1,4-di-n-hexadecyl-1,4-diazabicyclo[2.2.2]octanium dithiocyanate,
(21) 1,4-di-n-decyl-1,4-diazabicyclo[2.2.2]octanium perchlorate,
(22) 1,10-decamethylenebis(4-lauryl-1,4-diazabicyclo[2.2.2]octanium)tetrabromide,
(23) n-Octadecyltri-n-butylphosphonium bromide,
(24) n-Hexadecyltriphenylphosphonium bromide,
(25) 5,5,7,7-tetramethyl-2-octenyltri-n-butylphosphonium chloride,
(26) 1-(3,5-dioxo-6-oxa-4-aza)tetracosyltri-n-butylphosphonium bromide,
(27) 1,1-dimethyl-1-(n-hexadecyl)hydrazonium perchlorate,
(28) 1,1-dimethyl-1-(γ-stearamidopropyl)hydrazonium chloride,
(29) N-cetyl-N-ethylmorpholinium p-ethosulfate,
(30) N-methyl-N-myristyloxymethylmorpholinium p-toluenesulfonate,
(31) 1,4-dimethyl-1,4-di-n-laurylpiperazinium dibromide,
(32) S-n-butyl-S-methyl-S-n-octadecylsulfonium p-toluenesulfonate,
(33) S-ethyl-S-methyl-S-(γ-stearoyloxypropyl) sulfonium p-toluenesulfonate,
(34) S,S-di-n-lauryl-S-methylsulfonium thiocyanate,
(35) N,N-dimethyl-N-(β-dimethylaminoethyl)-N-(n-hexadecyl)ammonium bromide,
(36) Hexadecyltri-n-butylphosphonium bromide,
(37) N-dodecyl-N-methylmorpholinium chloride,
(38) N-methyl-N-octadecyloxymethylmorpholinium p-toluenesulfonate,
(39) Methyltri-n-laurylammonium chloride,
(40) n-Octadecyl-dimethyl-β-hydroxyethyl ammonium bromide,
(41) Sec.-butyl-1,4-diazabicyclo[2.2.2]octanium dibromide,
(42) N-cyclohexyl-N,N-dimethyl-N-(dodecylthiomethyl) ammonium p-toluenesulfonate,
(43) Octadecyltrimethylammonium bromide,
(44) N,N-dimethyl-N-(β-hydroxyethyl)-N-(γ-stearamidopropyl) ammonium chloride, and
(45) N,N-dimethyl-N-(β-hydroxyethyl)-N-(γ-stearamidopropyl) ammonium thiocyanate.

10. In a photographic color diffusion transfer process wherein an acid dye is transferred imagewise by diffusion to a mordanting reception layer, the improvement which comprises utilizing as said mordanting reception layer a layer comprising a hydrophilic organic colloid containing substantially uniformly dispersed therein finely-divided particles less than about 30 microns in diameter of a hydrophobic salt prepared with gelatin acylated with a dicarboxylic acid having the formula

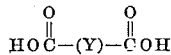

wherein Y is a divalent hydrocarbon radical having 1 to 10 carbon atoms and a nonpolymeric organic cationic mordant for acid dyes selected from the group consisting of compounds having the formulas

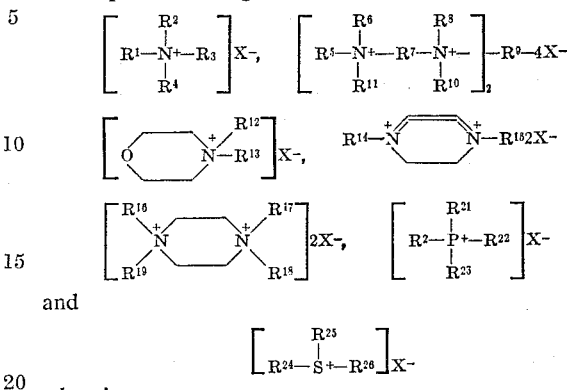

and

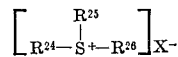

wherein:
A. $R^1$, $R^2$, $R^5$, $R^6$, $R^8$, $R^{10}$, $R^{11}$, $R^{14}$, $R^{15}$, $R^{16}$, $R^{17}$, $R^{18}$, $R^{19}$, $R^{20}$, $R^{21}$, $R^{22}$, $R^{24}$ and $R^{25}$ are alkyl radicals,
B. $R^3$ is selected from the group consisting of
 (1) an amino radical,
 (2) an alkyl radical, and
 (3) a cyclohexyl radical,
C. $R^4$, $R^{12}$, $R^{13}$, $R^{23}$ and $R^{26}$ are selected from the group consisting of
 (1) an alkyl radical, and
 (2) a cyclohexyl radical,
D. X is an acid anion, and
E. $R^7$ and $R^9$ are alkylene radicals;
said mordant being ballasted with at least one substituent having at least 8 carbon atoms.

11. A photographic diffusion transfer process as described in claim 10 wherein the hydrophilic organic colloid comprising the mordanting reception layer is selected from the group consisting of gelatin and polyvinyl alcohol.

12. A photographic diffusion transfer process as described in claim 10 wherein the dicarboxylic acid used to acylate the gelatin comprising the hydrophobic salt is phthalic acid.

13. A photographic diffusion transfer process as described in claim 10 wherein the dicarboxylic acid used to acylate the gelatin comprising the hydrophobic salt is succinic acid.

14. In a photographic color diffusion transfer process wherein an acid dye is transferred imagewise by diffusion to a mordanting reception layer, the improvement which comprises utilizing as said mordanting reception layer a layer comprising a gelatin substrate having substantially uniformly dispersed therein finely-divided particles less than about 30 microns in diameter of a hydrophobic salt prepared with gelatin acylated with a dicarboxylic acid having the formula

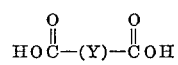

wherein Y is a divalent hydrocarbon radical having 1 to 10 carbon atoms and a nonpolymeric organic cationic mordant for acid dyes selected from the group consisting of
(1) Octadecyltri-n-butylammonium bromide,
(2) Tetradecyltri-n-butylammonium bromide,
(3) Octadecyltri-n-octylammonium bromide,
(4) Octadecyltri-n-decylammonium bromide,
(5) Methyltri-n-laurylammonium p-toluenesulfonate,
(6) Methyltri-n-decylammonium p-toluenesulfonate,
(7) Tetra-n-octylammonium bromide,
(8) Tetra-n-decylammonium bromide,
(9) Tetra-n-laurylammonium bromide,
(10) N,N-dimethyl-N-(β-hydroxyethyl)-N-(γ-stearamidopropyl) ammonium dihydrogen phosphate,
(11) N,N-dimethyl-N-(β-hydroxyethyl)-N-(γ- stearoyloxypropyl) ammonium chloride,
(12) N,N-dimethyl-N-(β-hydroxyethyl)-N-(p-tert-octylphenoxydiethoxyethyl)ammonium methosulfonate,
(13) N,N-dimethyl-N-(β-hydroxyethyl)-N-(p-tert-octylphenoxytetraethoxyethyl)ammonium methosulfonate,
(14) N,N-dimethyl-N-(β-hydroxyethyl)-N-(N-methyl-γ-stearamidopropyl)ammonium bromide,
(15) Cetyltrimethylammonium bromide,
(16) 17,17,20,20,31,31,34,34-octamethyl-17,20,31,34-tetrazapentacontaniumtetrabromide,
(17) 1,4-dihexadecyl-1,4-diazabicyclo[2.2.2]octanium dichloride,
(18) 1,4-didodecyl-1,4-diazabicyclo[2.2.2]octanium p-toluene sulfonate,
(19) 1,4-bis[γ-(2,4-di-tert-ampylphenoxy)butyl]-1,4-diazabicyclo[2.2.2]octanium chloride,
(20) 1,4-di-n-hexadecyl-1,4-diazabicyclo[2.2.2]octanium dithiocyanate,
(21) 1,4-di-n-decyl-1,4-diazabicyclo[2.2.2]octanium perchlorate,
(22) 1,10-decamethylenebis(4-lauryl-1,4-diazabicyclo[2.2.2]octanium)tetrabromide,
(23) n-Octadecyltri-n-butylphosphonium bromide,
(24) n-Hexadecyltriphenylphosphonium bromide,
(25) 5,5,7,7-tetramethyl-2-octenyltri-n-butylphosphonium chloride,
(26) 1-(3,5-dioxo-6-oxa-4-aza)tetracosyltri-n-butylphosphonium bromide,
(27) 1,1-dimethyl-1-(n-hexadecyl)hydrazonium perchlorate,
(28) 1,1-dimethyl-1-(γ-stearamidopropyl)hydrazonium chloride,
(29) N-cetyl-N-ethylmorpholinium p-ethosulfate,
(30) N-methyl-N-myristyloxymethylmorpholinium p-toluenesulfonate,
(31) 1,4-dimethyl-1,4-di-n-laurylpiperazinium dibromide,
(32) S-n-butyl-S-methyl-S-octadecylsulfonium p-toluenesulfonate,
(33) S-ethyl-S-methyl-S-(γ-stearoyloxypropyl)sulfonium p-toluenesulfonate,
(34) S,S-di-n-lauryl-S-methylsulfonium thiocyanate,
(35) N,N-dimethyl-N-(β-dimethylaminoethyl)-N-(n-hexadecyl)ammonium bromide,
(36) Hexadecyltri-n-butylphosphonium bromide,
(37) N-dodecyl-N-methylmorpholinium chloride,
(38) N-methyl-N-octadecyloxymethylmorpholinium p-toluenesulfonate,
(39) Methyltri-n-laurylammonium chloride,
(40) n-Octadecyl-dimethyl-β-hydroxyethyl ammonium bromide,
(41) Sec.-butyl-1,4-diazabicyclo[2.2.2]octanium dibromide,
(42) N-cyclohexyl-N,N-dimethyl-N-(dodecylthiomethyl) ammonium p-toluenesulfonate,
(43) Octadecyltrimethylammonium bromide,
(44) N,N-dimethyl-N-(β-hydroxyethyl)-N-(γ-stearamidopropyl)ammonium chloride, and
(45) N,N-dimethyl-N-(β-hydroxyethyl)-N-(γ-stearamidopropyl)ammonium thiocyanate.

15. In a photographic color diffusion transfer process wherein an acid dye is transferred imagewise by diffusion to a mordanting reception layer, the improvement which comprises utilizing as said mordanting reception layer a layer comprising a gelatin substrate having substantially uniformly dispersed therein finely-divided particles less than about 30 microns in diameter of a hydrophobic salt prepared with phthaloylated gelatin and N,N-dimethyl-N-(β-hydroxyethyl)-N-(γ-stearamidopropyl) ammonium dihydrogen phosphate.

16. In a photographic color diffusion transfer process wherein an acid dye is transferred imagewise by diffusion to a mordanting reception layer, the improvement which comprises utilizing as said mordanting reception layer a layer comprising a gelatin substrate having substantially uniformly dispersed therein finely-divided particles less than about 30 microns in diameter of a hydrophobic salt prepared with phthaloylated gelatin and N,N-dimethyl-N-(β-hydroxyethyl) - N - (γ-stearamidopropyl)ammonium chloride.

17. In a photographic color diffusion transfer process wherein an acid dye is transferred imagewise by diffusion to a mordanting reception layer, the improvement which comprises utilizing as said mordanting reception layer a layer comprising a gelatin substrate having substantially uniformly dispersed therein finely-divided particles less than about 30 microns in diameter of a hydrophobic salt prepared with phthaloylated gelatin and N,N-dimethyl-N-(β-hydroxyethyl) - N - (N - methyl-γ-stearamidopropyl) ammonium bromide.

18. In a photographic color diffusion transfer process wherein an acid dye is transferred imagewise by diffusion to a mordanting reception layer, the improvement which comprises utilizing as said mordanting reception layer a layer comprising a gelatin substrate having substantially uniformly dispersed therein finely-divided particles less than about 30 microns in diameter of a hydrophobic salt prepared with phthaloylated gelatin and N-cetyl-N-ethylmorpholinium p-ethosulfate.

19. In a photographic color diffusion transfer process wherein an acid dye is transferred imagewise by diffusion to a mordanting reception layer, the improvement which comprises utilizing as said mordanting reception layer a layer comprising a gelatin substrate having substantially uniformly dispersed therein finely-divided particles less than about 30 microns in diameter of a hydrophobic salt prepared with phthaloylated gelatin and octadecyltri-n-butylammonium bromide.

20. In a photographic process for mordanting an acid dye image, the improvement which comprises mordanting said dye image in a mordanting layer comprising a hydrophilic organic colloid containing substantially uniformly dispersed therein finely-divided particles of a hydrophobic salt prepared with gelatin acylated with a dicarboxylic acid having the formula

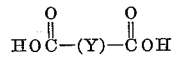

wherein Y is a divalent hydrocarbon radical having 1 to 10 carbon atoms and a nonpolymeric organic cationic mordant for acid dyes selected from the group consisting of compounds having the formulas

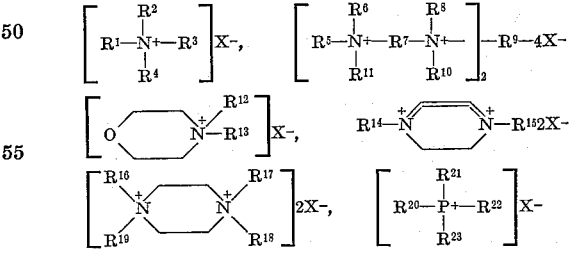

and

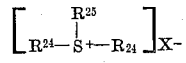

wherein:
A. $R^1$, $R^2$, $R^5$, $R^6$, $R^8$, $R^{10}$, $R^{11}$, $R^{14}$, $R^{15}$, $R^{16}$, $R^{17}$, $R^{18}$, $R^{19}$, $R^{20}$, $R^{21}$, $R^{22}$, $R^{24}$ and $R^{25}$ are alkyl radicals,
B. $R^3$ is selected from the group consisting of
  (1) an amino radical,
  (2) an alkyl radical, and
  (3) a cyclohexyl radical,
C. $R^4$, $R^{12}$, $R^{13}$, $R^{23}$ and $R^{26}$ are selected from the group consisting of
  (1) an alkyl radical, and
  (2) a cyclohexyl radical,
D. X is an acid anion, and E. $R^7$ and $R^9$ are alkylene radicals;
said mordant being ballasted with at least one substituent having at least 8 carbon atoms.

References Cited by the Examiner

UNITED STATES PATENTS

| | | | |
|---|---|---|---|
| 2,114,564 | 4/1938 | Kling et al. | 8—84 |
| 2,176,896 | 10/1939 | Epstein | 8—84 |
| 2,434,178 | 1/1948 | Royer et al. | 8—84 |
| 2,525,753 | 10/1950 | Yutzy et al. | 260—117 |
| 2,548,575 | 4/1951 | Weyerts | 101—149.1 |
| 2,852,382 | 9/1958 | Ilingsworth | 96—97 |
| 2,868,077 | 1/1959 | Ryan et al. | 88—65 |
| 2,983,606 | 5/1961 | Rogers | 96—29 |
| 3,212,893 | 10/1965 | Salminen | 96—29 |

FOREIGN PATENTS 607,420   8/1961   Belgium.

NORMAN G. TORCHIN, *Primary Examiner.*

G. H. BJORGE, J. T. BROWN, *Assistant Examiners.*